US006957333B2

United States Patent
He

(10) Patent No.: US 6,957,333 B2
(45) Date of Patent: Oct. 18, 2005

(54) SYSTEM AND METHOD FOR ENCRYPTED COMMUNICATIONS BETWEEN ELECTRONIC DEVICES

(75) Inventor: Duanfeng He, S. Setauker, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 108 days.

(21) Appl. No.: 10/242,401

(22) Filed: Sep. 12, 2002

(65) Prior Publication Data

US 2004/0054900 A1 Mar. 18, 2004

(51) Int. Cl.[7] .......................... H04L 9/00; G03G 15/00
(52) U.S. Cl. ...................................... 713/168; 713/183
(58) Field of Search .............................. 713/168, 183; 705/65; 340/5.61, 572.1, 573.1; 119/863

(56) References Cited

U.S. PATENT DOCUMENTS

| | | | | |
|---|---|---|---|---|
| 5,629,981 A | * | 5/1997 | Nerlikar | ..................... 713/168 |
| 5,959,533 A | * | 9/1999 | Layson et al. | ........... 340/573.1 |
| 6,078,888 A | * | 6/2000 | Johnson, Jr. | ..................... 705/1 |
| 6,283,065 B1 | * | 9/2001 | Shorrock et al. | ........... 119/863 |
| 6,545,604 B1 | * | 4/2003 | Dando et al. | ............. 340/572.1 |
| 6,738,903 B1 | * | 5/2004 | Haines | ........................ 713/168 |
| 2002/0005774 A1 | * | 1/2002 | Rudolph et al. | ........... 340/5.61 |
| 2002/0087867 A1 | * | 7/2002 | Oberle et al. | ................ 713/183 |
| 2003/0130955 A1 | * | 7/2003 | Hawthorne | ................... 705/65 |

* cited by examiner

Primary Examiner—Ayaz Sheikh
Assistant Examiner—Arezoo Sherkat
(74) Attorney, Agent, or Firm—Fay Kaplum & Marcin, LLP

(57) ABSTRACT

Described is a system and method for encrypted communications. The system may include first and second transponders. The first transponder has a first memory arrangement that stores a first key. The second transponder includes a second memory arrangement and has an access to a second key. The first transponder generates a first message for delivery to the second transponder, and encrypts the first message using a randomization key to generate a second message. Then, the first transponder encrypts (a) the second message and (b) one of the a randomization key corresponding index using the first key to generate a third message. The second key may decrypt the third message.

40 Claims, 5 Drawing Sheets

SYSTEM AND METHOD FOR ENCRYPTED COMMUNICATIONS BETWEEN ELECTRONIC DEVICES

FIELD OF THE INVENTION

The present invention relates to a system and method for encrypted communications between electronic devices (e.g., radio frequency identification ("RFID") devices).

BACKGROUND

Many organizations are promoting and developing universal RFID devices such as tags, interrogators and transponders. Some organizations aim to provide RFID devices with a universal access protocol at a minimal cost (e.g., about five cents). Low production cost and universal access would ensure the wide-spread usage of the RFID devices. One of the possible benefits of such RFID devices is the ability to track belongings. A manufacturer, at the request of a merchant, could install RFID devices in its products, (e.g., key chains, remote controls, wallets, etc.)

One of the existing concerns of such universal RFID devices is that they may allow tracking an individual without his knowledge by tracking his possessions having embedded RFID devices. A possible solution to this privacy concern is an implementation of a "kill command" allowing the individual to disable the RFID device. This solution is short-sighted since it destroys the value and the purpose of the RFID device. If one disables the RFID device, the individual can no longer track his belongings. Conversely, if one does not disable the RFTD device, he is at risk of being tracked himself. Some argue that there are no repercussions upon the individual: either he chooses to use the RFID device or he disables it. The basis for that argument is that an individual does not have to pay directly for the RFID device. Therefore, there is no need for a system that allows the individual to use the RFTD system without jeopardizing one's privacy. Such an argument has little merit since the merchants and manufacturers transfer the cost of producing RFID devices to the individual by including its cost in the retail price. Thus, it is in the individual's interest to be able to utilize the RFID system while safeguarding his privacy.

Another concern is that the RFID system would allow anyone to access the information stored in the RFID devices. For example, an unauthorized person may traverse through a store with the RFID device that issues "kill commands" to the RFID devices embedded in the merchandise and neutralize them before the merchandise is checked out of the store. Furthermore, once the "kill command" has been issued it destroys the usefulness of the RFID device since it is no longer able to transmit signals.

Another example involves an individual working for a competitor who might perform an inventory check of the store. A proposed solution to this problem is the installation of the RFID interrogators throughout the store. The RFID interrogators would detect unauthorized RFID communications and alert security forces. This system is inconvenient and cumbersome since it relies on an ubiquity of interrogators within the store which is a very costly investment. In addition, the use of security forces in locating the unauthorized persons is a time-consuming and costly endeavor.

SUMMARY OF THE INVENTION

The present invention relates to a system and method for encrypted communications. The system may include first and second transponders. The first transponder has a first memory arrangement that stores a first key. The second transponder includes a second memory arrangement and has an access to a second key. The first transponder generates a first message for delivery to the second transponder, encrypts the first message using a randomization key to generate a second message. Then, the first transponder encrypts (a) the second message and (b) one of the randomization key and corresponding index using the first key to generate a third message. The second key may decrypt the third message.

BRIEF DESCRIPTION OF THE DRAWINGS

The accompanying drawings are included to provide a further understanding of the invention and are incorporated in and constitute part of the specification, illustrate several embodiments of the invention and, together with the description, serve to explain examples of the present invention. In the drawings.

DETAILED DESCRIPTION

The present invention is directed at a system and method for encrypted communications for a plurality of electronic devices and, in particular, for radio frequency identification ("RFID") devices.

Figure 1:
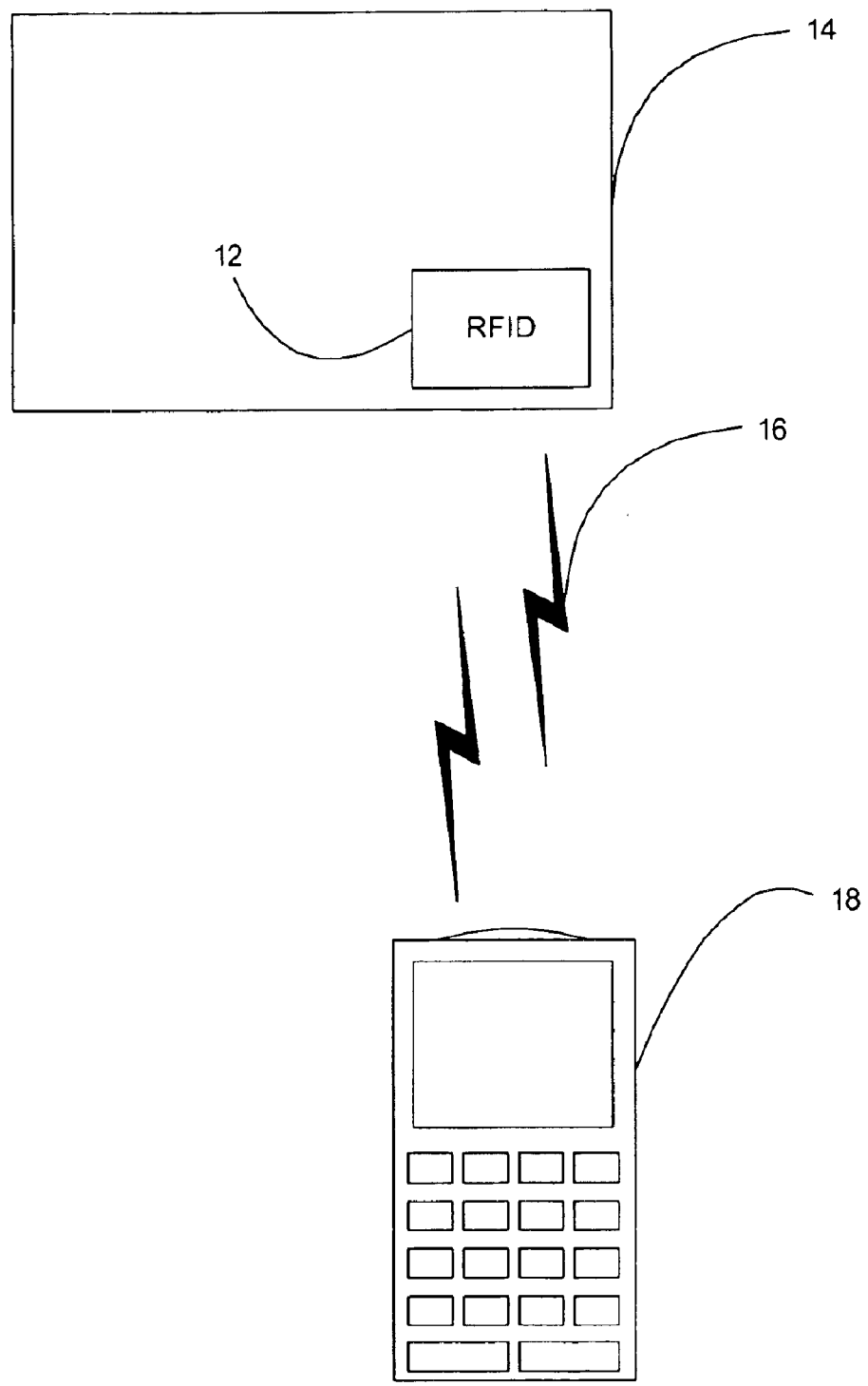
FIG. 1 shows an exemplary embodiment of a system including an RFID transponder communicating with an RFID interrogator according to the present invention.

Universal RFID transponders may be implanted in a variety of items (e.g., electronic equipment, clothing, furniture, etc.) so that those items may be tracked. FIG. 1 shows an RFID transponder 12 embedded in an exemplary item (e.g., a coat 14, a desk, a chair, a particular equipment, a car, etc.). The coat 14 is merely an example of an item that includes the transponder 12. The transponder 12 may be placed anywhere on the coat 14. For example, the transponder 12 may be concealed so that the coat 14 does not lose its aesthetic value and/or the transponder 12 cannot be easily found and removed. The transponder 12 may be either (a) active (i.e., powered by an internal battery and typically capable of being both read and written by the reader) or (b) passive (i.e., operate without a separate external power source by obtaining operating power generated from the reader and are generally capable only of being read by the reader)

The transponder 12 communicates with an RFID interrogator 18 through radio waves 16. The radio waves 16 may be of any type with frequencies ranging from 30 KHz (i.e., a short reading range) to 2.5 GHz (i.e., a longer reading range—over 90 feet and a high reading speed).

Figure 2:
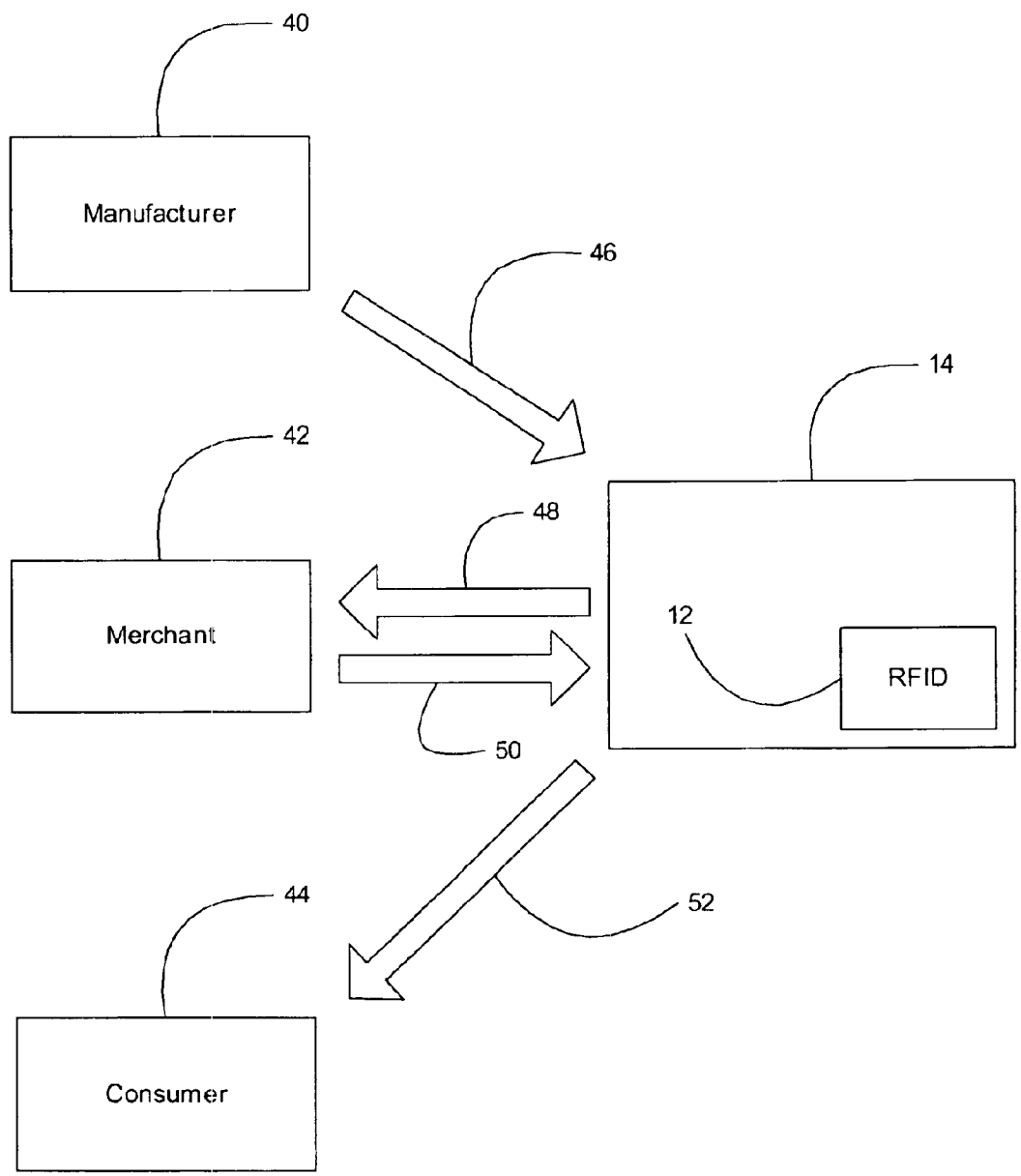
FIG. 2 shows an exemplary flow of a product from a manufacturer to a consumer according to the present invention.

FIG. 2 shows a transportation flow of the coat 14 from a manufacturer 40 to a merchant 42 and subsequently to a consumer 44. During step 46, the manufacturer 40 installs the transponder 12 into the coat 14. The manufacturer 40 then ships the coat 14 to the merchant 42. The manufacturer 40 may also equip the transponder 12 with a public encryption key of the receiving merchant 42. The manufacturer 40 may install the public encryption key of the merchant 42 into the transponder 12 either before or after installing the transponder 12 into the coat 14. Alternatively, the manufacturer 40 may purchase the transponders 12 so that they are already preprogrammed with the public key of the merchant 42. Encrypted communications between the interrogator 18 and the transponder 12 conceals the message from the public view since it only allows interrogators 18 with a proper private decryption key to view it. The encryption process during the step 46 is described further in step 22 shown in FIG. 3.

In step 48, the merchant 42 receives the coat 14 and stores it in his inventory. Since the transponder 12 has been programmed with the merchant's public key, the merchant 42 may communicate with the transponder 12 using the interrogator 18 that contains the corresponding private key.

In the step 50, the consumer 44 purchases the coat 14 and the merchant 42 delivers it to the consumer 44. At that point, the consumer 44 may communicate with the transponder 12 in a substantially similar manner as done by the merchant 42 in step 48. This process is described in more detail in step 24 shown in FIG. 3.

At the point of sale, the merchant 42 removes the encryption key by utilizing a special command signed with its private key, which matches the public key stored in the transponder 12. In step 52, the consumer 44 receives the coat 14 and equips the transponder 12 with his personal public encryption key. After the transponder 12 has been equipped using a new public key the consumer 44 may communicate with the transponder 12 using the corresponding private key. These processes are described further in the steps 26, 28, and 30 shown in FIG. 3.

Figure 3:
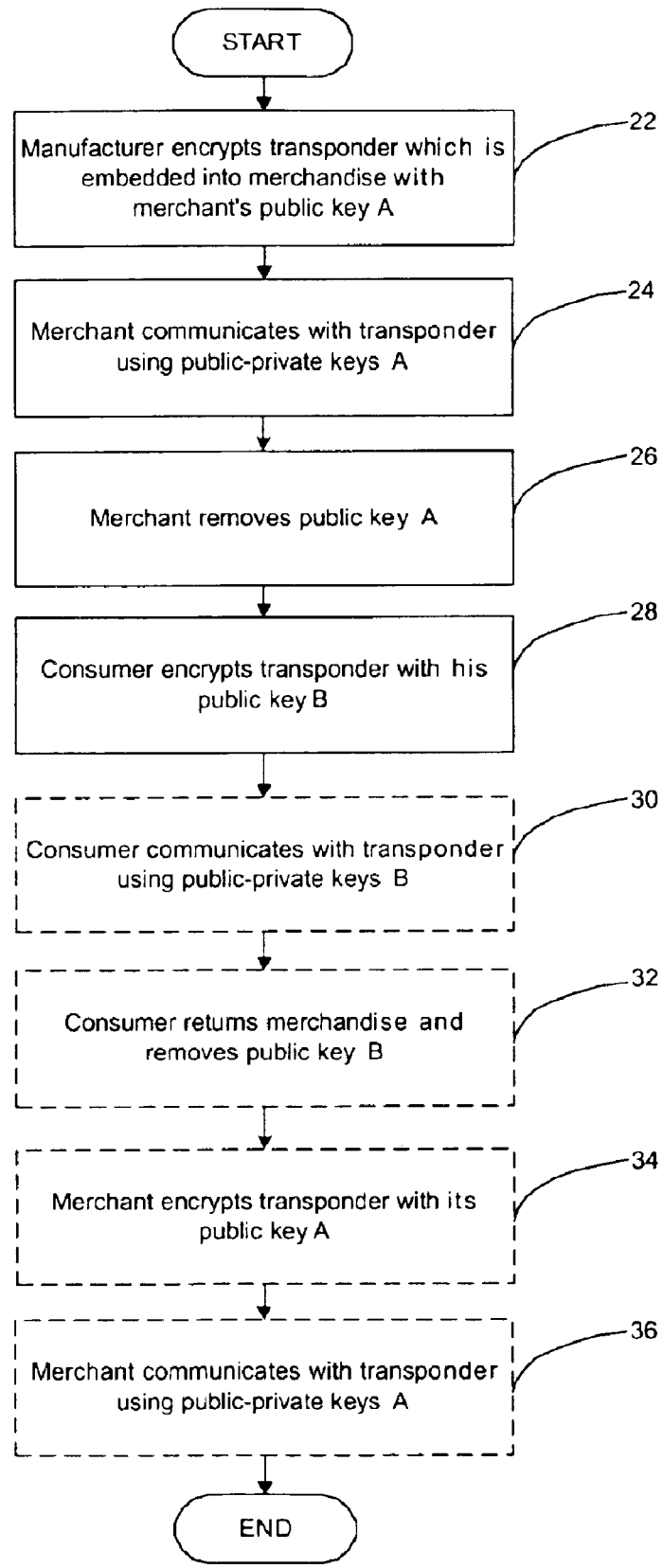
FIG. 3 shows an exemplary embodiment of a method according to the present invention.

FIG. 3 shows an exemplary embodiment of the method for encrypted communications according to the present invention. In the step 22, the manufacturer 40 installs the transponder 12 into the coat 14. As mentioned above, the transponder 12 may be placed anywhere on the coat 14 or even within the coat 14 since the physical boundaries of the coat 14 are not an obstacle for the radio waves.

The encryption process may be similar to a method used by a Pretty Good Privacy ("PGP") encryption protocol. The PGP, for example, is primarily used to encrypt e-mail messages using a public key system. The public key encryption method involves two keys: a public key and a private key. The public key is created and distributed by the recipient to potential senders. The senders use the public key to encrypt the message and the recipient uses the corresponding private key to decode the message. Only the individual who has access to the private key may decrypt and read the message. Thus, a third party who has access to the corresponding public key may not decrypt the message.

In the present invention, the installed transponder 12 contains an electronic message that contains pertinent identification information (e.g., a serial number, part number, etc.). The entire message is encrypted with, e.g., a public key A. The message usually does not need to be encrypted at this stage unless a physical tampering with the transponder 12 is highly probable and harmful, which is generally not the case with universal RFTD transponders. The public key A is distributed to the manufacturer 40 by the merchant 42 who has the private key A. After installing the transponder 12, the manufacturer 40 may equip the transponder 12 with the merchant's public key A. The manufacturer 40 then ships the coat 14 to the merchant 42.

In the step 24, the merchant 42, upon receiving the coat 14 from the manufacturer 40, communicates with the transponder 12 using the interrogator 18 that contains the private key A. Alternatively, the interrogator 18 may send the encrypted message to a host computer which may either possess or have access through a network connection to the private key A. The merchant 42 communicates with the transponder 12 in order to be able to conduct his business more efficiently (e.g., tabulating inventory, tracking merchandise, etc.). The private key A may be stored in a device that communicates with the transponder 12, such as the interrogator 18. When the interrogator 18 attempts to communicate with the transponder 12, it uses the private key to decrypt any message stored in the transponder 12. If the private key corresponds to the public key used to encrypt the message contained in the transponder 12, then the interrogator 18 may extract the data from the transponder 12.

Once the consumer 44 purchases the coat 14 with the transponder 12 encrypted with the public key A, it is suggested that the merchant 42 should remove the public key A. Once the merchant's public key A is removed, the transponder 12 does not respond to any further interrogation. One reason for removing the merchant's encryption public key may be to make the consumer 44 the only individual with access to a new private encryption key. Another reason may be the need to deprive the merchant 42 of the ability to continue tracking the coat 14.

The transponder 12 may only store one public key at a time. Thus, in order for a new public key to be stored in the transponder 12, the old public key needs to be removed. In that instance, the merchant 42 removes the public key A stored in the transponder 12 upon the request of the consumer 44 by utilizing a special command signed with its private key A which matches the public key A stored in the transponder 12 (step 26).

Once the consumer is in possession of the coat 14, he equips the transponder 12 with his public key B (step 28). The transponder 12 is no longer storing public key A in its memory, and hence, it is available to receive and store the new public key B. The transponder 12 is encrypted with the public key B in a substantially similar manner as was done by the manufacturer 40 in the step 22.

In the step 30, which may be optional, once the transponder 12 is equipped with the public key B, the consumer 44 may be able to communicate with the transponder 12 by using the interrogator 18 that has the private key B. The communication may be accomplished by using the interrogator 18 that contains the private key B. The consumer 44 may wish to communicate with the transponder 12 to facilitate easy tracking of the coat 14. The communication process is substantially similar to the communications performed by the merchant 42 using the private key A, described in the step 24. If the consumer 44 does not equip the transponder 12 with the public key B, then he will not be able to track the coat 14, but his privacy is not jeopardized.

The steps 32–36 are optional since they describe the process of returning the coat 14 by the consumer 44 to the merchant 42. The reasons for returning a previously purchased item are many and diverse (e.g., defect, dissatisfaction, mistake, etc.). Prior to transferring possession of the coat 14, the consumer 44 removes the public key B stored in the transponder 12 by utilizing a special digitally signed command which matches the public key B stored in the transponder 12 (step 32). After this process is complete, the transponder 12 contains no public encryption keys and is ready to receive and store a new public key, such as public key A of the merchant 42.

In the step 34, the merchant 42 equips the transponder 12 with the public key A. This procedure ensures that the merchant 42 can once again take control of the transponder 12 to conduct his business. In addition, it prevents the consumer 44, as well as any other individual, from abusing the system (i.e., continuing tracking returned merchandise, equipping the transponder 12 with a different public key, etc.). This step 34 is substantially similar to the installation of the transponder 12 with public keys A and B as described in steps 22 and 28. In the step 36, the merchant 42 communicates with the transponder 12 using a reader that contains the public key B. This process is substantially similar to the communication processes performed by the merchant 42 and the consumer 44 in the steps 24 and 30, respectively.

Figure 4:
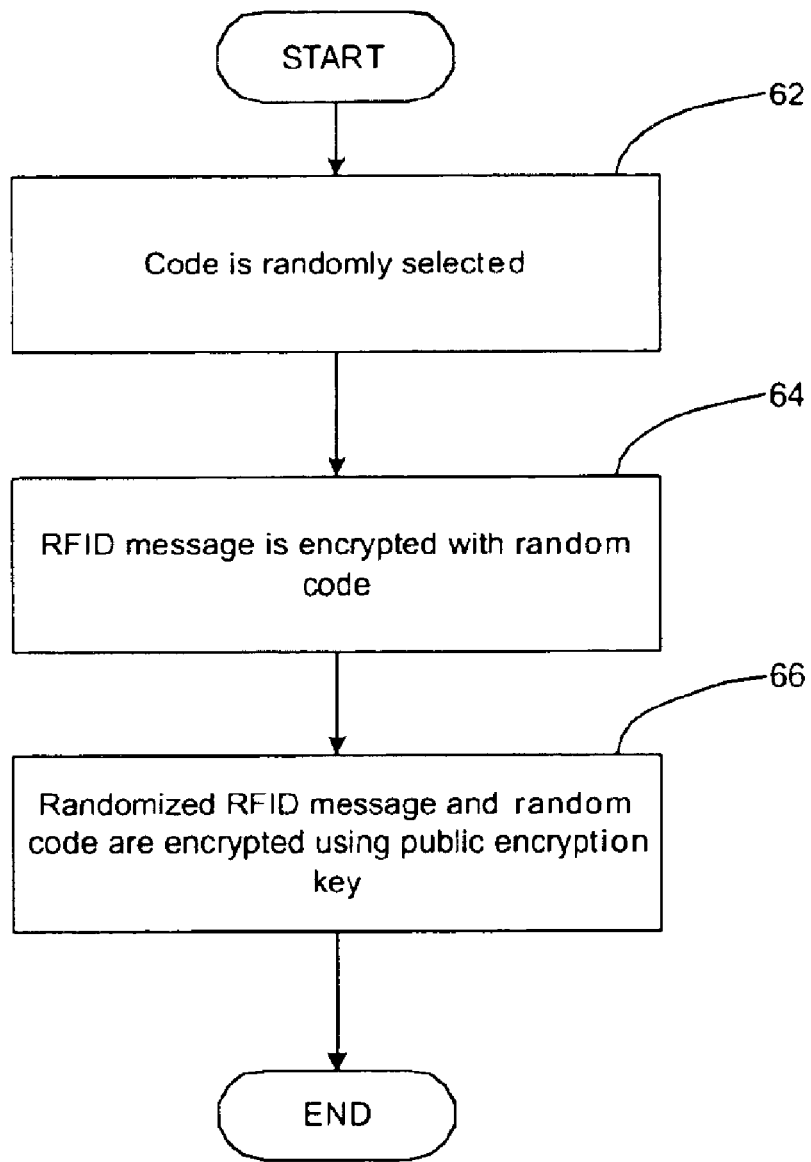
FIG. 4 shows an exemplary embodiment of an encryption method according to the present invention.
Figure 5:
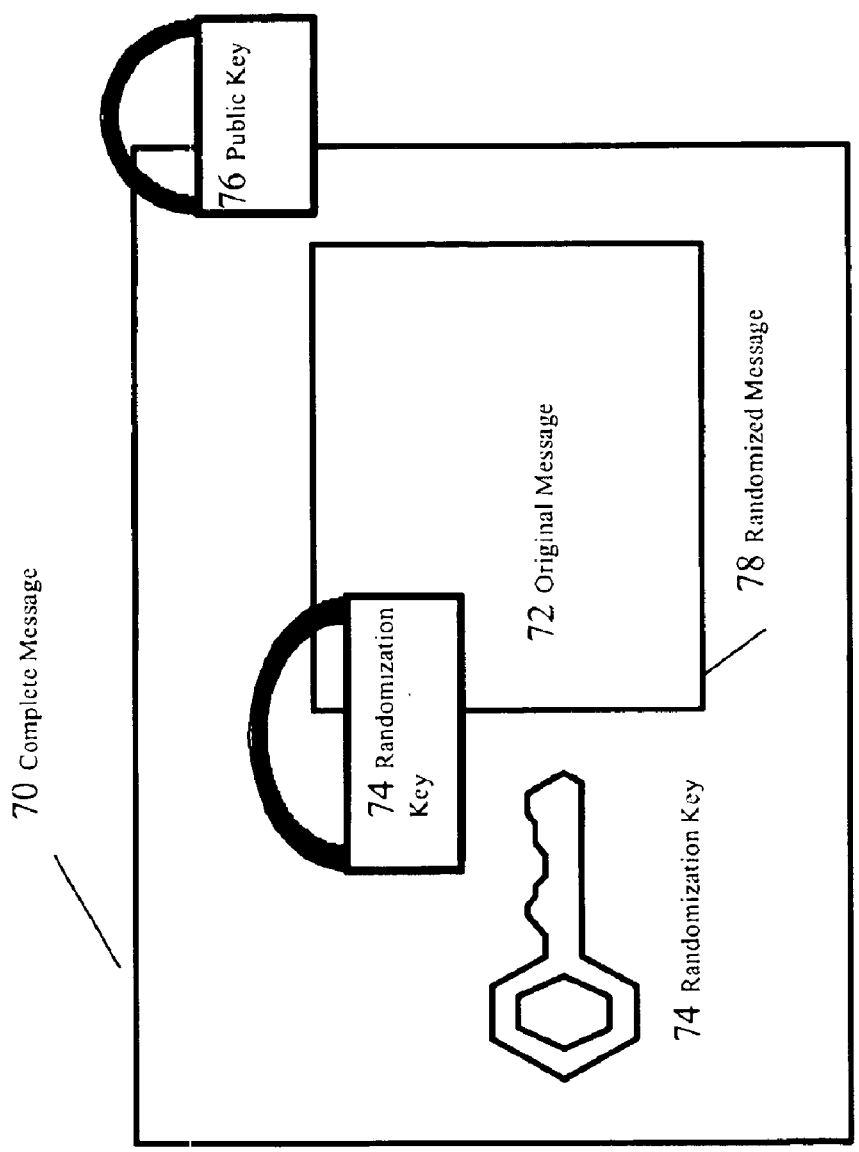
FIG. 5 shows a schematic diagram of an exemplary message after it is processed using the method according the present invention.

FIG. 4 shows a method according to the present invention for further improvement of the present invention. This method aims to prevent the tracking of the transponder 12 as described above without decrypting the messages (e.g., by tracking the encrypted version of the message). This method may use, e.g., any simple and reversible mathematical operation, such as cyclically shifting or exclusive or by a random code. FIG. 5 shows a schematic diagram of the message after it was processed using the method shown in FIG. 4. The original message 72 stored on the transponder 12 is shown as a rectangle in the center protected by a subsequent randomization key 74 and a public key 76.

In the step 62, the randomization key 74 is randomly selected from a plurality of preexisted codes. Alternatively, the randomization key 74 is randomly generated based on a predetermined mathematical algorithm. The randomization key 74 may be stored in a memory of the transponder 12 or the interrogator 18 depending where the original message 72 is being originated. For example, the memory of the transponder 12 may utilize mostly read-only memory ("ROM"). The transponder 12 according to the present invention may require more memory so that it may contain additional data and programs (e.g., encryption keys, encryption-decryption programs, etc.). In addition, the transponder 12 may have read-write memory that is utilized for computation during the encryption-decryption and randomization processes.

In the step 64, the original message 72 is encrypted with the randomization key 74 to generate a randomized message 78. In the step 66, the randomized message 78 along with the randomization key 74 and/or an index to the randomization key 74 (not shown) are encrypted using the public key 76 stored within the transponder 12 to generate the complete message 70.

As indicated above, the randomized message 78 may be encrypted along with the index to the randomization key 74. In such case, each of the interrogator 18 and the transponder 12 store the randomization key 74 (e.g., 256, 1024 keys, etc.) and corresponding indexes. A number of randomization keys 74 stored may depend on the size of memory arrangement of the interrogator 168 and the transponder 12 (e.g., 32–128 bytes).

Alternatively, the randomized message 78 may be encrypted along with the randomization key 74. In such case, only the transponder 12 may have the randomization key 74 which may be (a) randomly selected from a plurality of pre-existed randomization keys or (b) randomly generated based on a predetermined algorithm. Once the randomized message 78 is decrypted using the randomization key 74, the key 74 is erased from the memory arrangement. The advantages of this embodiment is that it reduces the memory requirements of the interrogator 18 and that it decreases the burden on the standardization process involved in selecting a series of randomization keys 74.

The decryption process of the complete message 70 is substantially similar to the encryption process. In particular, the complete message 70 may be subsequently decrypted with a corresponding private key 76. Once the complete message 70 is decrypted with the private key 76, the randomized message 78 and the randomization key 74 or the index are extracted. Subsequently, the randomized message 78 is decrypted using the randomization key 74 to extract the original message 72.

In an alternative exemplary embodiment of the present invention, interrogator 18 is connected to a computer (not shown). The interrogator 18 forwards the complete message 70 to the computer which performs the decryption process of described above to extract the original message 72 and other way around. One of the advantage of this particular embodiment is that the interrogator 18 may cost less and less complicated since the encryption and/or decryption of messages is performed by the computer and the interrogator 18 just acts as intermediator between the transponder 12 and the computer.

One of the advantages of the present invention is that it addresses the problem of unauthorized access to the transponder 12 without disabling it (i.e., depriving the public of the transponder's usefulness). The encryption of RFTD communications allows a consumer with a proper private key to decrypt and access the information encoded on the transponder 12. To prevent the unauthorized programming of the transponder 12 after it is decrypted and before it is encrypted by the rightful owner, the transponder 12 may be designed so that it may only allow the setup of a new encryption key if certain physical contacts are made (e.g., two exposed electrodes of the transponder 12 are connected with a conductor (e.g., a coin or a screw)). Such design may prevent an unauthorized person to immediately reactivate the transponder 12 and "lock-out" the rightful owner at critical locations (e.g., at the exit of the store).

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A system for encrypted communications, comprising:
   a first transponder including a first memory arrangement which stores a first key;
   a second transponder including a second memory arrangement and having an access to a second key,
   wherein the first transponder generates a first message to the second transponder, the first transponder encrypting the message using a randomization key to generate a second message, the first transponder encrypting (a) the second message and (b) one of the randomization key and an index to the randomization key using the first key to generate a third message,
   wherein the second key is capable of decrypting the third message, wherein the third message includes the index to the randomization key, wherein a plurality of randomization keys and corresponding indexes are stored in each of the first and second memory arrangements.

2. The system according to claim 1, wherein the first and second transponders are RFID transponders.

3. The system according to claim 1, wherein one of the first and second transponders is embedded into merchandise and another transponder is a portable transponder.

4. The system according to claim 3, wherein the first memory arrangement includes data relating to the merchandise.

5. The system according to clam 4, wherein the data includes at least one of a serial number of the merchandise, a part number and a description of the merchandise.

6. The system according to claim 1, wherein the first key is public key and the second key is a corresponding private key.

7. The system according to claim 1, wherein the first and second keys are replaceable with a corresponding pair of further first and further second keys.

8. The system according to claim 1, wherein the first transponder generates the first message in response to a request submitted by the second transponder.

9. The system according to claim 8, wherein the first message is not generated if the first key is absent from the first memory arrangement.

10. The system according to claim 1, wherein the third message includes the randomization key, the second transponder receives and decrypts the third message using the second key to generate the second message and the randomization key, the second transponder decrypting the second message using the randomization key to generate the first message.

11. The system according to claim 1, wherein the second transponder receiving and decrypting the third message using the second key to generate the second message and the index, the second transponder decrypting the second message using the randomization key which corresponds to the index to generate the first message.

12. The system according to claim 1, wherein each of the first and second memory arrangements includes a first portion which is a read-only memory and a second portion which is a rewritable memory, the first portion storing a plurality of randomization keys.

13. The system according to claim 12, wherein the second portion temporarily stores the randomization key.

14. The system according to claim 12, wherein the second portion stores the first key.

15. The system according to claim 12, wherein the second portion stores the second key.

16. The system according to claim 1, wherein the first memory arrangement stores a plurality of randomization keys and wherein the randomization key is randomly selected from the plurality of the randomization keys.

17. The system according to claim 1, wherein the randomized key is generated by the first transponder based on a preexisting randomization algorithm.

18. The system according to claim 1, wherein the second key is stored in the second memory arrangement.

19. The system according to claim 1, wherein the second key is stored in a remote computer which is connected to a digital communication network, the second transponder having the access to the second key via the digital communication network.

20. The system according to claim 1, wherein one of the first and second transponders is embedded into merchandise and another transponder includes a portable transponder and a computer, the portable transponder coupled to the computer, the computer including the second memory arrangement, the portable transponder transmitting the third message between the computer and the transponder embedded into the merchandise.

21. A method for encrypted communications, comprising the steps of:

generating a first message by a first transponder for delivery to the second transponder, the first transponder including a first memory arrangement which stores a first key, the second transponder including a second memory arrangement and having an access to a second key;

encrypting the first message using a randomization key to generate a second message by the first transponder; and encrypting (a) the second message and (b) one of the randomization key and a corresponding index using the first key to generate a third message by the first transponder, wherein the second key is capable of decrypting the third message, wherein the third message includes the index to the randomization key, wherein a plurality of randomization keys and corresponding indexes are stored in each of the first and second memory arrangements.

22. The method according to claim 21, wherein the first and second transponders are RFID transponders.

23. The method according to claim 21, further comprising the step of:

embedding one of the transponders into merchandise, wherein the other one of the transponders is a portable transponder.

24. The method according to claim 23, wherein the first memory arrangement includes data relating to the merchandise.

25. The method according to clam 24, wherein the data includes at least one of a serial number of the merchandise, a part number and a description of the merchandise.

26. The method according to claim 21, wherein the first key is public key and the second key is a corresponding private key.

27. The method according to claim 21, further comprising the steps of:

removing the first and second keys; and installing a corresponding pair of further first and further second keys in place of the first and second keys.

28. The method according to claim 21, further comprising the step of:

before the generating step, submitting a request by the second transponder to the first transponder, wherein the first transponder generates the first message in response to the request.

29. The method according to claim 28, further comprising the step of:

refusing to generate the first message by the first transponder when the first key is absent from the first memory arrangement.

30. The method according to claim 21, wherein the third message includes the randomization key, the method further comprising the steps of:

receiving by the second transponder the third message;

decrypting the third message using the second key to generate the second message and the randomization key; and decrypting the second message using the randomization key to generate the first message.

31. The method according to claim 21, wherein the third message includes the index to randomization key, wherein a plurality of randomization keys and corresponding indexes are stored in each of the first and second memory arrangements, the method further comprising the steps of:

receiving by the second transponder the third message;

decrypting the third message using the second key to generate the second message and the index; and decrypting the second message using the randomization key code which corresponds to the index to generate the first message.

32. The method according to claim 21, wherein each of the memory arrangements include a first portion which a read-only memory and a second portion which is a rewritable memory, the first portion storing the plurality of randomization keys.

33. The method according to claim 32, further comprising the step of:

temporarily storing the randomization key in the second portion.

34. The method according to claim 32, further comprising the step of:

storing the first key in the second portion.

35. The method according to claim 30, further comparing the step of:

storing the second key in the second portion.

36. The method according to claim 21, wherein the first memory arrangement storing a plurality of randomization keys, the method further comprising the step of:

randomly selecting the randomization key from the plurality from the plurality of randomization keys.

37. The method according to claim 21, further comprising the step of:

generating the randomization key by the first transponder based on a preexisting randomization algorithm.

38. The method according to claim 21, wherein the second key is stored in the second memory arrangement.

39. The method according to claim 21, wherein the second key is stored in a remote computer which is connected to a digital communication network, the method further comprising the step of:

accessing the second key by the second transponder via the digital communication network.

40. The method according to claim 21, wherein one of the first and second transponders is embedded into merchandise and another transponder includes a portable transponder and a computer, the portable transponder coupled to the computer, the computer including the second memory arrangement, the method further comprising the step of:

with the portable transponder, transmitting the third message between the computer and the transponder embedded into the merchandise.

* * * * *